Patented Aug. 28, 1945

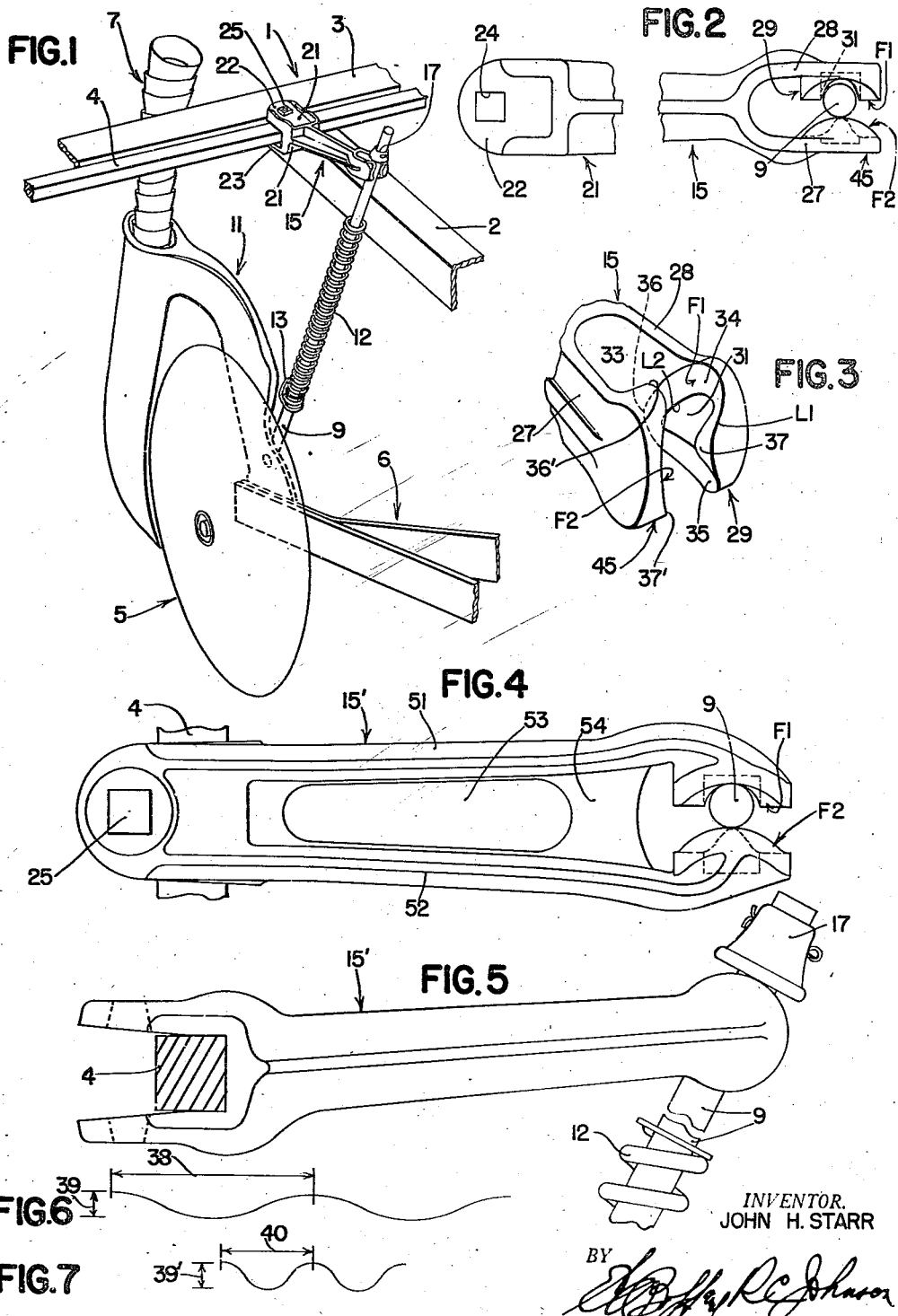

2,383,693

UNITED STATES PATENT OFFICE 2,383,693

GRAIN DRILL

John H. Starr, Mayville, Wis., assignor to The Van Brunt Manufacturing Co., Horicon, Wis., a corporation of Wisconsin Application January 7, 1944, Serial No. 517,455

10 Claims. (Cl. 74—102)

The present invention relates generally to agricultural machines and more particularly to implements, such as grain drills and the like, having tool means adapted to be raised and lowered.

The object and general nature of the present invention is the provision of an improved pressure arm particularly adapted for grain drills and the like, in which the tool means is operatively connected with the pressure arm by a pressure rod but in which the trunnion connection, heretofore required to establish a pivot between the arm and rod, is entirely eliminated. More specifically, it is an important feature of this invention to provide a pressure arm or the like with a pair of cooperating surfaces shaped so that a pressure rod or the like disposed therebetween is constrained, so far as its rotary movement relative to the arm is concerned, to swing about an axis. Particularly, it is a feature of this invention to provide means establishing a pivot connection between a pair of relatively movable parts but without employing pivots, trunnions or the like, and still further, it is a feature of this invention to provide a connection of this type between a rockably mounted arm and a generally elongated rod whereby relative movement between the rod and arm is, so far as rotary movement is concerned, limited to a movement about an axis but in which the rod is capable of generally longitudinal movement through the arm.

These and other objects and advantages of the present invention will be apparent to those skilled in the art after a consideration of the following detailed description, taken in conjunction with the accompanying drawing illustrating the preferred embodiments of my invention.

In the drawing:

Figure 1 is a fragmentary perspective view showing a portion of a grain drill in which the principles of the present invention have been incorporated, a part of the pressure spring being shown in dotted lines in order best to illustrate the connection between the pressure rod and the pressure arm.

Figure 2 is an enlarged plan view of my improved pressure arm with pressure rod in place therein.

Figure 3 is an enlarged perspective illustrating the curvature of the cooperating opposed surfaces which act to hold the rod in proper position.

Figures 4 and 5 are plan and side views, respectively, of a modified form of pressure arm but embodying the same construction so far as the pivot-establishing opposed surfaces are concerned.

Figure 6 is a development of the radially outer edge of one of the curved surfaces on the pressure arm.

Figure 7 is a development of the radially inner edge of one of the curved surfaces on the pressure arm.

Referring first to the form of the invention shown in Figures 1–3, the reference numeral 1 indicates a frame of a grain drill which includes a plurality of generally longitudinally extending bars 2 and at least one transverse bar 3. Mounted by suitable bearings (not shown) on the longitudinal frame members 2 is a rockshaft or pressure shaft 4 which is preferably square in cross section. The grain drill 1 includes a plurality of disk-like furrow openers 5, each connected to the rear end of a drag bar structure 6, the front end of which is generally pivotally connected to a front angle (not shown) forming a part of the grain drill frame 1. The latter includes seed containing and dispensing mechanism by which seed is delivered through a seed tube 7 into the furrow opened by the associated disk 5. A pressure rod 9 is connected at its lower end (not shown) by a pivot pin or the like to a casting 11 which forms the lower part of the seed tube structure 7, and a coil spring 12 is disposed about each of the pressure rods 9, bearing at its lower end against an adjustable abutment 13 and at its upper end, when the furrow openers 5 are in their operating position, against a pressure arm 15 that is secured to the pressure shaft 4. A cap 17 is secured to the upper end of the rod 9, whereby, when the rockshaft 4 is rocked to swing the forward ends of the arms 15 upwardly, the arms contact the caps 17 and, acting through the associated pressure rods 9, lift all of the furrow openers out of engagement with the ground, raising them into their non-working or transport positions. Figure 1 shows the relative positions of the parts when the tools are raised. When the tools are lowered, the arm 15 is swung downwardly, the outer end of each arm engaging the upper end of the associated spring and, compressing the same, serves to force the tools into the ground so as to form the desired seed-receiving furrows.

The present invention is principally concerned with the arm 15 and now referring to Figures 1 and 2, it will be seen that the arm 15 is provided with a bifurcated rear end 21 having upper and lower ears 22 and 23, which are apertured, as at 24, to receive a clamping bolt 25. The spaced apart bifurcated sections 22 and 23 receive therebetween the pressure shaft 4 of the grain drill 1 so that, when tightened, the bolt 25 securely clamps the arm 15 in place.

The forward section of the arm 15 is also bifurcated, providing right and left hand sections 27 and 28 disposed in laterally spaced apart relation, as best shown in Figures 2 and 3. Each of these sections is provided with a laterally inwardly directed pad, the left-hand pad being indicated by the reference numeral 29. Referring first to the left-hand pad 29, it will be seen from Figure 3 that it is generally in the form of a cylindrical boss having a central recess 31. The laterally inner face F¹ which is formed between the marginal section of the central recess 31 and the radially outer margin of the boss 29, is formed as a curved or developed surface having two opposite depressions 34 and 35 and two opposite projections or crests 36 and 37. The surface of the face F¹ is so shaped that the various elements making up the surface are radial elements passing through the center of curvature of the outer cylindrical portion of the pad 29, the elements intersecting the cylindrical surface just mentioned in a line L¹ which is peripherally undulatory and, when developed, as shown in Figure 6, is generally sinusoidal in character having a pitch indicated at 38 and a depth indicated at 39 in Figure 6. The intersection of the elements making up the face F¹ with the wall of the recess 31, which is cylindrical, also lie in a line L² that when developed, as shown in Figure 7, is also sinusoidal, having the same depth, indicated at 39', as the depth of the line L¹ (Figure 6) but a smaller pitch, indicated at 40 in Figure 7.

The pad on the other arm section 27 is indicated in Figures 2 and 3 by the reference numeral 45 and is provided with a face F² which is of practically exactly the same curvature and formation as the face F¹ except that it is rotated through 90 degrees about the axis of the arm ends 27 and 28, thereby placing the face F² in a position that is complementary with respect to the face F¹; that is to say, the crests 36' and 37' of the surface F² are directly opposite the depressions 34 and 35 of the surface F¹. Similarly, the crests 36 and 37 of the surface F² lie opposite the corresponding depressions of the surface F². Thus, the two undulatory surfaces F¹ and F² are disposed so that corresponding opposite points in such surfaces lie a constant distance apart, such distance being substantially equal to the diameter of the associated pressure rod 9, as best shown in Figure 2.

In operation, the rod 9 is capable of free sliding movement longitudinally of itself between the surfaces F¹ and F² yet is restrained against swinging bodily forwardly, or rearwardly, out from between the two surfaces F¹ and F². The curvature of such surfaces serve, in effect, to constrain relative movement between the rod 9 and arm 15, so far as rotary movement is concerned, to a rotary or rocking movement about the axis of the pads 29 and 45, and hence, the pads in effect provide for a pivotal connection between the rod and arm but at the same time eliminate any actual pivots, trunnions or the like. In assembling the parts, all that it is necessary to do to establish the aforesaid pivot connection between the rod and arm is to slide the rod longitudinally of itself into a position between the curved surfaces F¹ and F². During the pivoting or rocking movement of the rod 9 relative to the arm 15, the rod experiences a slight sidewise movement but this is readily accommodated by slight looseness at the lower end of the rod 9 where it joins the casting 11 and a slight clearance between the rod and the two surfaces F¹ and F².

Figures 4 and 5 show a slightly different form of arm 15 but which, for all practical purposes, embodies the same disposition and formation of the opposite surfaces F¹ and F². The arm 15' shown in Figures 4 and 5 is slightly wider, having two spaced apart sections 51 and 52 with an open space 53 therebetween. The pad ends of the arm 15' are reenforced by a connecting web 54. The opposite end of the arm 15' is bifurcated in substantially the same manner as the arm 15 and receives the same bolt 25 for securing the arm 15' to a pressure shaft, such as the pressure shaft 4.

While I have shown and described above the preferred structure in which the principles of the present invention have been incorporated, it is to be understood that my invention is not to be limited to the particular means shown and described above, but that, in fact, widely different means may be employed in the practice of the broader aspects of my invention.

What I claim, therefore, and desire to secure by Letters Patent is:

1. In apparatus of the type described having a pressure shaft and a member adapted to be raised and lowered, a pressure rod connected with said member, an arm adapted to be fixed to said shaft, the outer end of said arm being bifurcated to provide a generally vertical slot having a pair of adjacent mutually facing surfaces spaced apart a distance substantially equal to the diameter of said rod, each of said surfaces being arcuate about a center and shaped to accommodate rotation of said pressure rod about said axis and prevent lateral displacement of said rod between said surfaces generally in the plane of said arm.

2. In apparatus of the type described having a pressure shaft and a member adapted to be raised and lowered, a pressure rod connected with said member, an arm adapted to be fixed to said shaft, and means connecting said arm with said rod and constructed so as to establish an axis of pivotal connection in a position other than that of the actual connection between said arm and rod.

3. The invention set forth in claim 2, further characterized by said rod being freely movable, longitudinally of itself, relative to said arm.

4. In combination, a rockably mounted first part, an elongated part to be pivotally and slidably connected therewith and cooperating contacting means on said parts connecting the latter for movement about a pivot axis lying in a position spaced from the points of actual contact between said parts, said elongated part having a portion of substantially constant cross section to provide for sliding movement of elongated part relative to said first part.

5. In combination, a rockably mounted first part, an elongated part to be pivotally connected therewith, and cooperating contacting means on said parts connecting the latter for movement about a pivot axis lying in a position spaced from the points of actual contact between said parts, said means comprising a pair of spaced-apart undulatory faces on said one part formed so as to engage and guide the other part in its movement about said axis.

6. The invention set forth in claim 5, further characterized by said elongated part being a member having a circular cross section and said undulatory faces being spaced apart a distance substantially equal to the diameter of said circular cross section.

7. In combination, a rockable arm, a member to be moved, spring means on said member on one side of said arm, a cap on said member on the other side of said arm, the latter having spaced apart end sections disposed on opposite sides of said member and said sections having generally circular peripheries, said spring means and cap being adapted to bear against opposite sides of said circular peripheries, and means associated with said arm and member establishing a pivotal connection therewith, the axis of which coincides with the centers of said circular peripheries.

8. In combination, a rockable arm, a member to be moved, said arm having a bifurcated portion provided with spaced apart end sections disposed on opposite sides of said member and said sections having opposed annular faces of undulatory formation, one being complementary to the other, and the corresponding geometrical elements of each being parallel and radial, and said member having a portion generally circular in section disposed between and having line contact with said annular faces.

9. The invention set forth in claim 8, further characterized by said end sections including recessed portions in the central parts of said annular faces.

10. The invention set forth in claim 8, further characterized by the radially inner and outer margins of each of said annular faces lying in undulatory lines having different pitches but the same depth.

JOHN H. STARR.